(12) United States Patent
Shen et al.

(10) Patent No.: US 12,149,346 B2
(45) Date of Patent: Nov. 19, 2024

(54) FRAME CODING AND OPTICAL NETWORK UNIT (ONU) SYNCHRONIZATION IN PASSIVE OPTICAL NETWORKS (PONS)

(71) Applicant: HUAWEI TECHNOLOGIES CO., LTD., Shenzhen (CN)

(72) Inventors: Andy Shen, Morganville, NJ (US); Xiang Liu, Marlboro, NJ (US); Yuanqiu Luo, Cranbury, NJ (US); Frank Effenberger, Frisco, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 17/944,902

(22) Filed: Sep. 14, 2022

(65) Prior Publication Data

US 2023/0019473 A1 Jan. 19, 2023

Related U.S. Application Data

(63) Continuation of application No. PCT/US2020/044890, filed on Aug. 4, 2020.

(Continued)

(51) Int. Cl.
*H04L 1/00* (2006.01)

(52) U.S. Cl.
CPC .......... *H04L 1/0057* (2013.01); *H04L 1/0041* (2013.01); *H04L 1/0052* (2013.01)

(58) Field of Classification Search
CPC ... H04L 1/0057; H04L 1/0041; H04L 1/0052; H04L 1/0072; H04J 3/1694; H04Q 11/0071; H04Q 2213/1301; H04Q 11/0067
See application file for complete search history.

(56) References Cited

U.S. PATENT DOCUMENTS

2011/0142437 A1* 6/2011 Luo ................ H04J 3/0608
                                              398/1
2013/0272706 A1* 10/2013 Luo ................ H04B 10/27
                                              398/66

(Continued)

FOREIGN PATENT DOCUMENTS

CN    105409142 A      3/2016
EP    3480981 A1       5/2019
WO    2018014161 A1    1/2018

OTHER PUBLICATIONS

Khotimsky, "XG-PON Transmission Convergence Layer Specification (for Last Call); 272 Rev.3 (PLEN/15)," ITU-T Draft; Study Period 2009-2012, International Telecommunication Union, Geneva; CH, vol. 2/15, Jun. 28, 2010 (Jun. 28, 2010), pp. 1-145, XP017448062, [retrieved on Jun. 28, 2010] section 10.4.

(Continued)

*Primary Examiner* — Cynthia Britt
(74) *Attorney, Agent, or Firm* — Conley Rose, P.C.

(57) ABSTRACT

A method is implemented by an ONU in a 50G-PON. The method comprises receiving an encoded DS PHY frame from an OLT, the encoded DS PHY frame comprises an FEC codeword, the FEC codeword comprises an SFC field and a payload, and the SFC field and the payload are encoded with a same FEC; decoding the FEC codeword using the FEC to obtain a decoded SFC field and the payload; performing a first verification of the decoded SFC field while in a sync state of a synchronization state machine; and staying in the sync state when the first verification is successful or exiting the sync state when the first verification is unsuccessful.

20 Claims, 8 Drawing Sheets

Related U.S. Application Data (60) Provisional application No. 62/993,422, filed on Mar. 23, 2020.

(56) References Cited

U.S. PATENT DOCUMENTS

| | | | |
|---|---|---|---|
| 2019/0158220 A1* | 5/2019 | Gao | H04L 1/0075 |
| 2021/0006334 A1* | 1/2021 | Yoshino | H04B 10/27 |
| 2021/0184771 A1* | 6/2021 | Strobel | H04L 1/004 |
| 2022/0021481 A1* | 1/2022 | Liu | H04B 10/50 |
| 2023/0179896 A1* | 6/2023 | Liu | H04Q 11/0067 398/58 |

OTHER PUBLICATIONS

Luo, "FEC Design on 50G-PON," ITU-T Draft: Study Period 2017-2020; Study Group 15, International Telecommunication Union, Geneva, CH, vol. 2/15 Nov. 18, 2019 (Nov. 18, 2019), pp. 1-3, XP044281153, Retrieved from the Internet: URL:https://www.itu.int/ifa/t/2017/sg15/exchange/wp1/q2/19-11-19_Phonecall/191119_D08 FW_50GPON_PSync.docx [retrieved on Nov. 18, 2019] section 2.

Luo, "Proposal for ComTC Clause 10," ITU-T Draft; Study Period 2017-2020; Study Group 15, International Telecommunication Union, Geneva; CH, vol. 2/15 Jun. 5, 2020 (Jun. 5, 2020), pp. 1-12, XP044292000, Retrieved from the Internet: URL: https://www.itu.int/ifa/t/2017/sg15/exchange/wp1/q2/20-06-09_Phonecall/200609_D18_FW_ComTC_Clause%2010.docx [retrieved on Jun. 5, 2020].

Schaefer, "G. HSP: ONU Downstream Synchronization State Machine; C," ITU-T Draft, Study Period 2017-2020; Study Group 15; Series C, International Telecommunication Union, Geneva, CH, vol. 2/15, Mar. 20, 2020 (Mar. 20, 2020), pp. 1-7, XP044286266, Retrieved from the Internet: URL: https://www.itu.int/ifa/t/2017/sg15/exchange/wp1/qw/20-03-24_Phonecall/200324_D18_HSP_SYNC_update_V3.docx [retrieved on Mar. 20, 2020] section 2.

Schaefer, "G.HSP: ONU Downstream Synchronization; C" ITU-T Draft; Study Period 2017-2020; Study Group 15: Series C, International Telecommunication Union, Geneva; CH, vol. 2/15 Dec. 16, 2019 (Dec. 16, 2019), pp. 1-4, XP044281180, retrieved from the internet: URL:https://222.itu.int/ifa/t/2017/sg15/exchange/2p1/q2/19-12-17_Phonecall/OrignalUploads/191217_HSP_DS_PHY_Sync.dox [retrieved on Dec. 16, 2019] section 2.

Shen, "50G-PON Downstream Synchronization State Machine; C," ITU-T Draft; Study Period 2017-2020; Study Group 15; Series C, International Telecommunication Union, Geneva, CH; vol. 2/15 Apr. 16, 2020 (Apr. 16, 2020), pp. 1-5, XP044286308, Retrieved from the Internet: URL:https://www.itu.int/ifa/t/2017/sq15/exchange/wp1/q2/20-04-20_MultiCall/200420_D4_6_FW_50G-PON%20Synchronization%20Stage%20Machine.docx [retrieved on Apr. 16, 2020].

Wu, "Change the Order of Scrambling and FEC Encoding Process; TDNo]," ITU-T Draft; Study Period 2017-2020; Study Group 15; Series TDNO], International Telecommunication Union, Geneva, CH, vol. 2/15 Feb. 28, 2020 (Feb. 28, 2020), pp. 1-2, XP044286234, Retrieved from the Internet: URl: https://www.itu.int/ifa/t/2017/sg15/exchange/wp1/q2/20-03-03_Phonecall/200303_E03_HW_Change%20FEC%20ENCODING%20process.docx [retrieved on Feb. 28, 2020].

"Series G: Transmission Systems and Media, Digital Systems and Networks Access networks—Optical line systems for local and access networks Higher speed passive optical networks—Common transmission convergence layer specification," Recommendation ITU-T G.9804.2, Sep. 2021, 246 pages.

"Series G: Transmission Systems and Media, Digital Systems and Networks Digital sections and digital line system—Optical line systems for local and access networks Gigabit-capable passive optical networks (GPON): General characteristics," Recommendation ITU-T G.984.1, Mar. 2008, 43 pages.

"Series G: Transmission Systems and Media, Digital Systems and Networks Digital sections and digital line system—Optical line systems for local and access networks Gigabit-capable passive optical networks (GPON): General characteristics," Amendment 1, Recommendation ITU-T G.984.1, Oct. 2009, 8 pages.

"Series G: Transmission Systems and Media, Digital Systems and Networks Digital sections and digital line system—Optical line systems for local and access networks Gigabit-capable passive optical networks (GPON): General characteristics," Amendment 2, Recommendation ITU-T G.984.1, Apr. 2012, 16 pages.

"Series G: Transmission Systems and Media, Digital Systems and Networks Digital sections and digital line system—Optical line systems for local and access networks 10-Gigabit-capable passive optical networks (XG-PON): Transmission convergence (TC) layer specification," Recommendation ITU-T G.987.3, Jan. 2014, 146 pages.

"Series G: Transmission Systems and Media, Digital Systems and Networks Digital sections and digital line system—Optical line systems for local and access networks 10-Gigabit-capable passive optical networks (XG-PON): Transmission convergence (TC) layer specification," Amendment 1, Recommendation ITU-T G.987.3, Mar. 2020, 145 pages.

"Series G: Transmission Systems and Media, Digital Systems and Networks Access networks—Optical line systems for local and access networks Ethernet passive optical networks using OMCI," Recommendation ITU-T G.9801, Aug. 2013, 28 pages.

"Series G: Transmission Systems and Media, Digital Systems and Networks Access networks—Optical line systems for local and access networks 10-Gigabit-capable symmetric passive optical network (XGS-PON)," Recommendation ITU-T G.9807. Jun. 2016, 286 pages.

"Series G: Transmission Systems and Media, Digital Systems and Networks Access networks—Optical line systems for local and access networks 10-Gigabit-capable symmetric passive optical network (XGS-PON)," Amendment 1, Recommendation ITU-T G.9807.1, Oct. 2017, 290 pages.

"Series G: Transmission Systems and Media, Digital Systems and Networks Access networks—Optical line systems for local and access networks 10-Gigabit-capable symmetric passive optical network (XGS-PON)," Corrigendum 1, Recommendation ITU-T G.9807.1, Mar. 2020, 288 pages.

* cited by examiner

FRAME CODING AND OPTICAL NETWORK UNIT (ONU) SYNCHRONIZATION IN PASSIVE OPTICAL NETWORKS (PONS)

CROSS-REFERENCE TO RELATED APPLICATIONS

This is a continuation of Int'l Patent App. No. PCT/US2020/044890 filed on Aug. 4, 2020, which claims priority to U.S. Prov. Patent App. No. 62/993,422 filed on Mar. 23, 2020, both of which are incorporated herein by reference.

TECHNICAL FIELD

The disclosed embodiments relate to optical networks in general and frame coding and ONU synchronization in PONs in particular.

BACKGROUND

Optical networks are networks that use optical signals to carry data. Light sources such as lasers generate optical signals. Modulators modulate the optical signals with data to generate modulated optical signals. Various components transmit, propagate, amplify, receive, and process the modulated optical signals. Optical networks may implement multiplexing to achieve high bandwidths. Optical networks implement data centers, metropolitan networks, PONs, long-haul transmission systems, and other applications.

SUMMARY

In a first aspect, a method implemented by an ONU in a PON comprises: receiving an encoded DS PHY frame from an OLT, the encoded DS PHY frame comprises a codeword, the codeword comprises an SFC field and a payload, and the SFC field and the payload are encoded with a same FEC; decoding the codeword using the FEC to obtain a decoded SFC field and the payload; performing a first verification of the decoded SFC field while in a sync state of a synchronization state machine; and staying in the sync state when the first verification is successful or exiting the sync state when the first verification is unsuccessful.

In a first implementation form of the first aspect, the codeword further comprises a PSync field, wherein the method further comprises: performing a second verification of the PSync field while in the sync state; and staying in the sync state when the second verification is successful or exiting the sync state when the second verification is unsuccessful.

In a second implementation form of the first aspect or a preceding implementation form of the first aspect, the method further comprises further performing the second verification using K, wherein K≥7.

In a third implementation form of the first aspect or a preceding implementation form of the first aspect, the FEC uses an LDPC code.

In a fourth implementation form of the first aspect or a preceding implementation form of the first aspect, the LDPC code is based on a mother code of size (17,664, 14,592) where 17,664 is a bit length of the codeword and 14,592 is a bit length of the payload.

In a fifth implementation form of the first aspect or a preceding implementation form of the first aspect, the LDPC code has a length of 17,280 bits.

In a sixth implementation form of the first aspect or a preceding implementation form of the first aspect, the method further comprises: initializing in a hunt state of the synchronization state machine; proceeding from the hunt state to a pre-sync state of the synchronization state machine; and proceeding from the pre-sync state to the sync state.

In a seventh implementation form of the first aspect or a preceding implementation form of the first aspect, the method further comprises proceeding from the hunt state to the pre-sync state based on PSync pattern matching and SFC checking.

In an eighth implementation form of the first aspect or a preceding implementation form of the first aspect, the PSync pattern matching is based on a K, wherein K≥7.

In a ninth implementation form of the first aspect or a preceding implementation form of the first aspect, the SFC checking is based on BCH (63,12) and an additional parity bit in an HEC field.

In a tenth implementation form of the first aspect or a preceding implementation form of the first aspect, the method further comprises further proceeding from the pre-sync state to the sync state based on PSync pattern matching and SFC verification.

In an eleventh implementation form of the first aspect or a preceding implementation form of the first aspect, the PSync pattern matching is based on K, wherein K≥7.

In a twelfth implementation form of the first aspect or a preceding implementation form of the first aspect, the SFC verification is based on two consecutive valid SFC readings.

In a thirteenth implementation form of the first aspect or a preceding implementation form of the first aspect, the method further comprises: proceeding from the hunt state to the pre-sync state based only on PSync pattern matching; and proceeding from the pre-sync state to the sync state based only on the PSync pattern matching.

In a fourteenth implementation form of the first aspect or a preceding implementation form of the first aspect, the PSync pattern matching is based on K, wherein K≥7.

In a fifteenth implementation form of the first aspect or a preceding implementation form of the first aspect, the PSync pattern matching is based on a 64-bit PSync.

In a sixteenth implementation form of the first aspect or a preceding implementation form of the first aspect, the PSync pattern matching is further based on K, wherein K=7.

In a seventeenth implementation form of the first aspect or a preceding implementation form of the first aspect, the PSync pattern matching is based on a 128-bit pattern.

In an eighteenth implementation form of the first aspect or a preceding implementation form of the first aspect, the PSync pattern matching is further based on K, wherein 18≤K≤28.

In a nineteenth implementation form of the first aspect or a preceding implementation form of the first aspect, the 128-bit pattern is [PSync PSync'], wherein PSync' is the opposite of PSync, and wherein PSync is [0xC5E5 1840 FD59 BB49].

In a twentieth implementation form of the first aspect or a preceding implementation form of the first aspect, the method further comprises: proceeding from the hunt state to the pre-sync state based only on PSync pattern matching, and proceeding from the pre-sync state to the sync state based on a second verification of a first FEC codeword.

In a twenty-first implementation form of the first aspect or a preceding implementation form of the first aspect, the method further comprises returning from the pre-sync state to the hunt state when the second verification fails.

In a twenty-second implementation form of the first aspect or a preceding implementation form of the first aspect, the PSync pattern matching is based on K, wherein K≥7.

In a twenty-third implementation form of the first aspect or a preceding implementation form of the first aspect, the PSync pattern matching is based on a 64-bit pattern [0xC5E5 1840 FD59 BB49].

In a twenty-fourth implementation form of the first aspect or a preceding implementation form of the first aspect, the PSync pattern matching is further based on K, wherein K=7.

In a twenty-fifth implementation form of the first aspect or a preceding implementation form of the first aspect, the PSync pattern matching is based on a 128-bit pattern.

In a twenty-sixth implementation form of the first aspect or a preceding implementation form of the first aspect, the PSync pattern matching is further based on K, wherein 18≤K≤28.

In a twenty-seventh implementation form of the first aspect or a preceding implementation form of the first aspect, the 128-bit pattern is [PSync PSync'], wherein PSync' is the opposite of PSync, and wherein PSync is [0xC5E5 1840 FD59 BB49].

In a twenty-eighth implementation form of the first aspect or a preceding implementation form of the first aspect, the method further comprises proceeding from the sync state to a re-sync state of the synchronization state machine.

In a twenty-ninth implementation form of the first aspect or a preceding implementation form of the first aspect, the method further comprises further proceeding from the sync state to the re-sync state when either PSync pattern matching or SFC verification fails.

In a thirtieth implementation form of the first aspect or a preceding implementation form of the first aspect, the method further comprises returning from the re-sync state to the sync state when PSync pattern matching and SFC verification succeed.

In a thirty-first implementation form of the first aspect or a preceding implementation form of the first aspect, the method further comprises staying in the re-sync state for up to (M−2) consecutive failures of PSync pattern matching or SFC verification.

In a thirty-second implementation form of the first aspect or a preceding implementation form of the first aspect, the method further comprises returning from the re-sync state to a hunt state of the synchronization state machine when PSync pattern matching or SFC verification fails (M−1) times.

In a thirty-third implementation form of the first aspect or a preceding implementation form of the first aspect, M is ≥2.

In a thirty-fourth implementation form of the first aspect or a preceding implementation form of the first aspect, the method further comprises returning from the re-sync state to the sync state when PSync pattern matching and SFC verification are successful.

In a thirty-fifth implementation form of the first aspect or a preceding implementation form of the first aspect, the codeword further comprises a PSBd, and wherein the PSBd contains a PSync field and the SFC field.

In a thirty-sixth implementation form of the first aspect or a preceding implementation form of the first aspect, the PSBd is not scrambled.

In a thirty-seventh implementation form of the first aspect or a preceding implementation form of the first aspect, within the codeword, only the PSync field is not scrambled.

In a thirty-eighth implementation form of the first aspect or a preceding implementation form of the first aspect, before decoding the codeword, the method further comprises descrambling the codeword using a descrambler.

In a thirty-ninth implementation form of the first aspect or a preceding implementation form of the first aspect, the method further comprises further descrambling the codeword using a scrambling polynomial $x^{58}+x^{39}+1$.

In a fortieth implementation form of the first aspect or a preceding implementation form of the first aspect, the method further comprises further descrambling the codeword using a variable starting bit sequence based on the SFC field.

In a forty-first implementation form of the first aspect or a preceding implementation form of the first aspect, the variable starting bit sequence is [1 1 1 1 1 1 1 SFC], and wherein "SFC" represents bits of the SFC field.

In a forty-second implementation form of the first aspect or a preceding implementation form of the first aspect, the method further comprises further descrambling the codeword using a fixed starting sequence based on a fixed bit pattern.

In a forty-third implementation form of the first aspect or a preceding implementation form of the first aspect, the fixed starting bit sequence is 58 "1" bits.

In a forty-fourth implementation form of the first aspect or a preceding implementation form of the first aspect, after decoding the codeword, the method further comprises descrambling the payload using a descrambler.

In a forty-fifth implementation form of the first aspect or a preceding implementation form of the first aspect, the method further comprises further descrambling the payload using a scrambling polynomial $x^{58}+x^{39}+1$.

In a forty-sixth implementation form of the first aspect or a preceding implementation form of the first aspect, the descrambler is based on self-scrambling of data.

In a forty-seventh implementation form of the first aspect or a preceding implementation form of the first aspect, the descrambler is based on scrambling with a known bit pattern that starts with a fixed starting bit sequence.

In a forty-eighth implementation form of the first aspect or a preceding implementation form of the first aspect, the fixed starting bit sequence is 58 "1" bits.

In a forty-ninth implementation form of the first aspect or a preceding implementation form of the first aspect, the descrambler is based on scrambling with a known bit pattern with a variable starting bit sequence that contains the decoded SFC field.

In a fiftieth implementation form of the first aspect or a preceding implementation form of the first aspect, the variable starting bit sequence is [1 1 1 1 1 1 1 SFC], and wherein "SFC" represents bits of the decoded SFC field.

In a fifty-first implementation form of the first aspect or a preceding implementation form of the first aspect, the variable starting bit sequence is [1 0 1 0 1 0 1 SFC], and wherein "SFC" represents bits of the decoded SFC field.

In a fifty-second implementation form of the first aspect or a preceding implementation form of the first aspect, the PON is a 50G-PON.

In a second aspect, an ONU comprises: a memory configured to store instructions; and a processor coupled to the memory and configured to execute the instructions to perform any of the first aspect or a preceding implementation form of the first aspect.

In a third aspect, a computer program product comprises computer-executable instructions for storage on a non-transitory medium and that, when executed by a processor, cause an ONU to perform any of the first aspect or a preceding implementation form of the first aspect.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
BCH: Bose-Chaudhuri-Hocquenghem
BER: bit error ratio
CO: central office
CPU: central processing unit
DS: downstream
DSP: digital signal processor
EO: electrical-to-optical
FEC: forward error correction
FPGA: field-programmable gate array
FtS: FEC then scramble
Gb/s: gigabit(s) per second
HEC: hybrid error control
IEEE: The Institute of Electrical and Electronics Engineers
K: maximum number of allowed error bits
LDPC: low-density parity-check
ODN: optical distribution network
OE: optical-to-electrical
OLT: optical line terminal
ONT: optical network terminal
ONU: optical network unit
PHY: physical layer
PON: passive optical network
PON-ID: PON identifier
PSBd: DS physical synchronization block
PSync: physical synchronization (sequence)
P2MP: point-to-multipoint
RAM: random-access memory
RF: radio frequency
ROM: read-only memory
RX: receiver unit
SFC: superframe counter
SRAM: static RAM
StF: scramble then FEC
sync: synchronization
TCAM: ternary content-addressable memory
TX: transmitter unit
US: upstream
XG-PON: 10-gigabit-capable PON
µs: microsecond(s)
50G-PON: 50-gigabit-capable PON.

Figure 1:
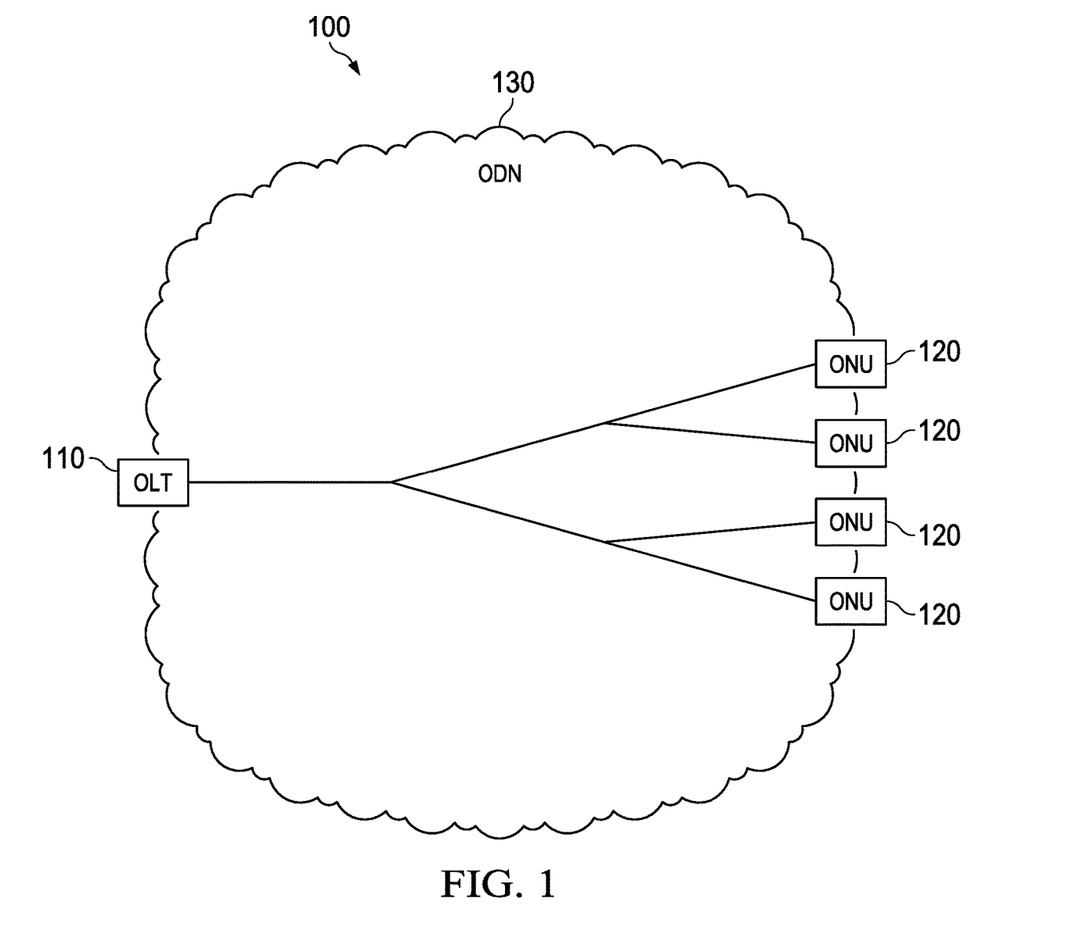
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute the data.

The OLT 110 communicates with another network and the ONUs 120. For instance, the OLT 110 forwards data from the other network to the ONUs 120 and forwards data from the ONUs 120 to the other network. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute data between the OLT 110 and the ONUs 120. The ODN 130 may extend from the OLT 110 to the ONUs 120 in a branching configuration as shown or may be configured in any other suitable P2MP configuration.

The ONUs 120 communicate with the OLT 110 and customers. For instance, the ONUs 120 forward data from the OLT 110 to the customers and forward data from the customers to the OLT 110. ONUs 120 and ONTs are similar, and the terms may be used interchangeably. The ONUs 120 are typically located at distributed locations such as customer premises, but they may also be located at other suitable locations.

Figure 2:
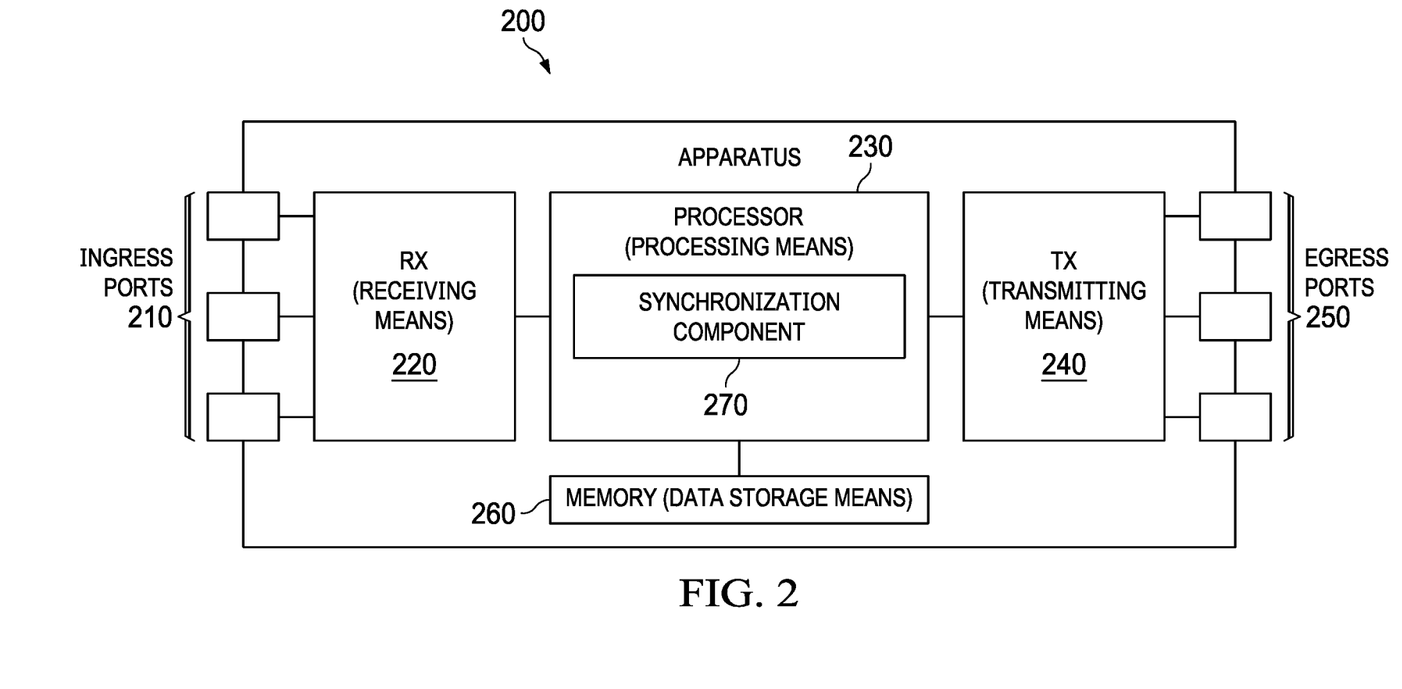
FIG. 2 is a schematic diagram of an apparatus.

FIG. 2 is a schematic diagram of an apparatus 200. The apparatus 200 may implement the OLT 110 and the ONUs 120. The apparatus 200 comprises ingress ports 210 and an RX 220 or receiving means to receive data; a processor 230 or processing means, or logic unit, baseband unit, or CPU, to process the data; a TX 240 or transmitting means and egress ports 250 to transmit the data; and a memory 260 or data storage means to store the data. The apparatus 200 may also comprise OE components, EO components, or RF components coupled to the ingress ports 210, the RX 220, the TX 240, and the egress ports 250 to provide ingress or egress of optical signals, electrical signals, or RF signals.

The processor 230 is any combination of hardware, middleware, firmware, or software. The processor 230 comprises any combination of one or more CPU chips, cores, FPGAs, ASICs, or DSPs. The processor 230 communicates with the ingress ports 210, the RX 220, the TX 240, the egress ports 250, and the memory 260. The processor 230 comprises a synchronization component 270, which implements the disclosed embodiments. The synchronization component 270 may comprise an FEC coder and a scrambler/descrambler. The synchronization component 270 in some embodiments comprises instructions executed by the processor 230 to perform the FEC coder and scrambler/descrambler operations or functions. The inclusion of the synchronization component 270 therefore provides a substantial improvement to the functionality of the apparatus 200 and effects a transformation of the apparatus 200 to a different state. Alternatively, the memory 260 stores the synchronization component 270 as instructions, and the processor 230 executes those instructions.

The memory 260 comprises any combination of disks, tape drives, or solid-state drives. The apparatus 200 may use the memory 260 as an over-flow data storage device to store programs when the apparatus 200 selects those programs for execution and to store instructions and data that the apparatus 200 reads during execution of those programs. The memory 260 may store additional or other data not mentioned herein. The memory 260 may be volatile or non-volatile and may be any combination of ROM, RAM, TCAM, or SRAM.

A computer program product may comprise computer-executable instructions for storage on a non-transitory medium and that, when executed by a processor, cause an apparatus to perform any of the embodiments. The non-transitory medium may be the memory 260, the processor may be the processor 230, and the apparatus may be the apparatus 200.

Figure 3:
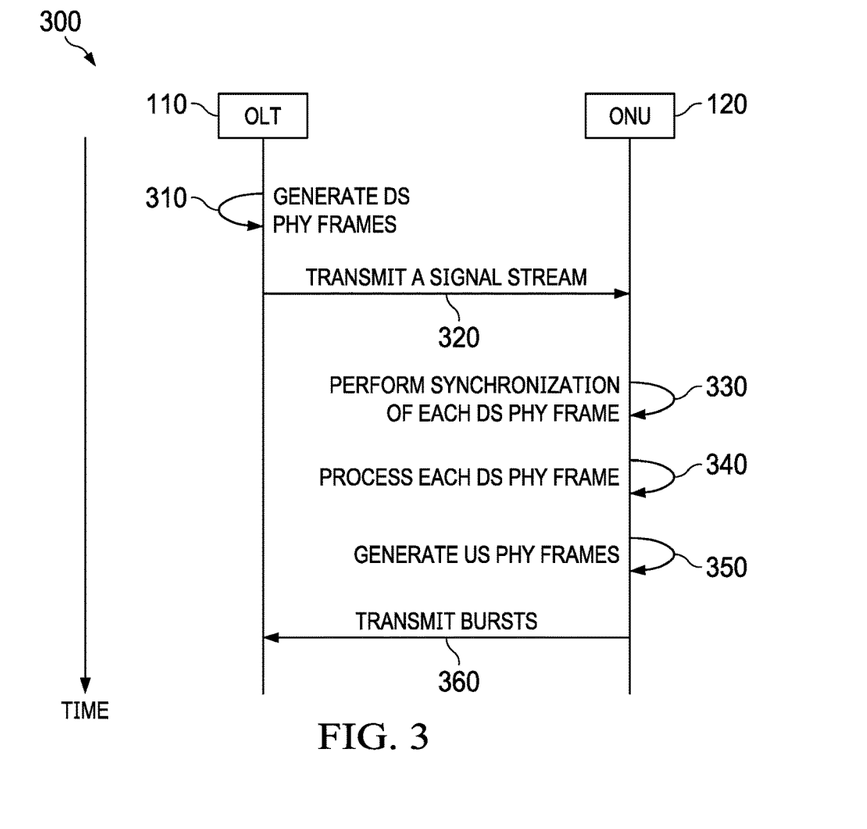
FIG. 3 is a message sequence diagram of PON communication.
Figure 4:
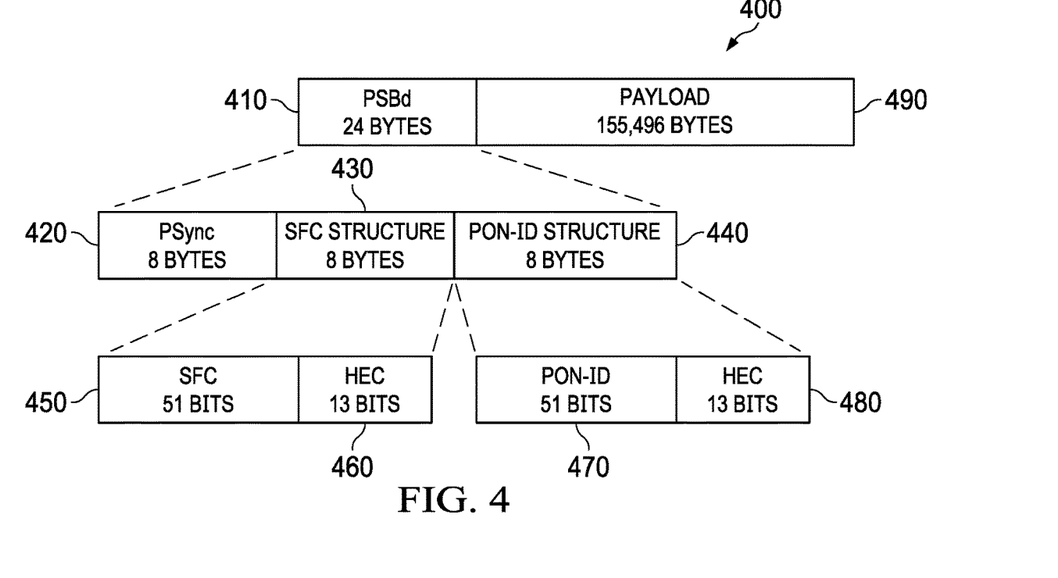
FIG. 4 is a schematic diagram of a DS PHY frame in XG-PON.

FIG. 3 is a message sequence diagram 300 of PON communication. At step 310, the OLT 110 generates DS PHY frames. The DS PHY frames may be as shown in FIG. 4. At step 320, the OLT 110 transmits a signal stream to an ONU 120. The signal stream comprises the DS PHY frames. At step 330, the ONU 120 performs synchronization of each DS PHY frame. The ONU 120 may do so as described below. At step 340, the ONU 120 processes each DS PHY frame. For instance, the ONU 120 may process payloads of the DS PHY frames for provision to a customer. At step 350, the ONU 120 generates US PHY frames. For instance, the ONU 120 generates the US PHY frames using data from the customer. Finally, at step 360, the ONU 120 transmits bursts. The bursts comprise the US PHY frames.

FIG. 4 is a schematic diagram of a DS PHY frame 400 in XG-PON. The DS PHY frame 400 has 155,520 bytes, which corresponds to 125 μs for the 9.95328 Gb/s data rate in XG-PON. The DS PHY frame 400 comprises a PSBd 410 of 24 bytes and a payload 490 of 155,496 bytes. The PSBd 410 facilitates synchronization in the ONUs 120. The PSBd 410 comprises a PSync field 420 of 8 bytes, an SFC structure field 430 of 8 bytes, and a PON-ID structure field 440 of 8 bytes. The PSync field 420 is fixed with a repeating 64-bit pattern. The SFC structure field 430 comprises an SFC field 450 of 51 bits and an HEC field 460 of 13 bits. The PON-ID structure field 440 comprises a PON-ID field 470 of 51 bits and an HEC field 480 of 13 bits. The payload 490 comprises data intended for customers of the ONUs 120.

Figure 5:
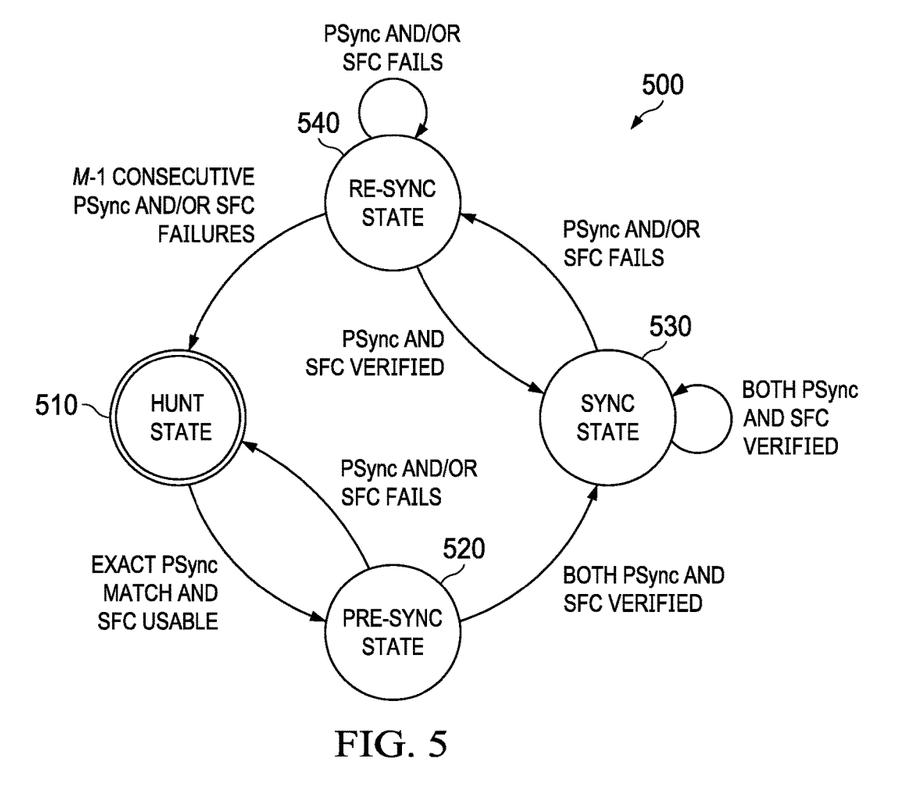
FIG. 5 is a diagram of a synchronization state machine.

FIG. 5 is a diagram of a synchronization state machine 500. An ONU 120 implements the synchronization state machine 500. The synchronization state machine 500 comprises a hunt state 510, a pre-sync state 520, a sync state 530, and a re-sync state 540.

The ONU 120 enters the hunt state 510 when it detects a valid DS signal. In the hunt state 510, the ONU 120 searches for a locally-stored, predetermined PSync in a first DS PHY frame 400. Specifically, the ONU 120 searches for the PSync in the PSync field 420. If there is no exact PSync match, then the ONU 120 remains in the hunt state 510. If there is an exact PSync match, then the ONU 120 determines whether the 8 bytes immediately following the PSync form a usable SFC, meaning a valid HEC-protected SFC for which HEC indicates no uncorrectable errors. If so, then the ONU 120 locally stores the 8 bytes as an SFC and proceeds to the pre-sync state 520. If not, then the ONU 120 remains in the hunt state 510.

In the pre-sync state 520, the ONU 120 searches for the PSync in a second DS PHY frame 400. The ONU 120 matches the PSync using K. In XG-PON, K=2 so that the ONU 120 needs to match only 62 bits out of the 64 bits from the PSync. If there is no PSync match, then the ONU 120 returns to the hunt state 510. If there is a PSync match, then the ONU 120 determines whether the 8 bytes immediately following the PSync are verified as an SFC, meaning they form a valid HEC-protected SFC for which HEC indicates no uncorrectable errors. If so, then the ONU 120 proceeds to the sync state 530. If not, then the ONU 120 returns to the hunt state 510.

In the sync state 530, the ONU 120 continues matching the PSync and verifying SFCs for additional DS PHY frames 400. Again, the ONU 120 matches the PSync using K. If there is a PSync match and a verified SFC, then the ONU 120 remains in the sync state 530. If there is no PSync match or no verified SFC, then the ONU 120 proceeds to the re-sync state 540.

In the re-sync state 540, the ONU 120 continues matching the PSync and verifying SFCs for additional DS PHY frames 400. Again, the ONU 120 matches the PSync using K. If there is a PSync match and a verified SFC, then the ONU 120 returns to the sync state 530. If there is no PSync match or no verified SFC for M−1 consecutive frames, then the ONU 120 returns to the hunt state 510. M is a positive integer that represents a maximum number of verification failures allowed starting from the Sync state. For instance, M=3.

In XG-PON, the OLT 110 encodes the payload 490 using FEC. A target BER threshold for the FEC in XG-PON is about 1e-3. This results in obtaining synchronization within about 8 DS PHY frames 400 and false loss of synchronization occurring about every 10 years. FEC may be more powerful in 50G-PON than in XG-PON. The target BER threshold for the FEC in 50G-PON may be about 3e-2, which is much higher than the 1e-3 BER threshold in XG-PON. At the higher BER threshold in 50G-PON, the HEC field 460 may not reliably protect the SFC field 450. Specifically, obtaining synchronization may take 100 DS PHY frames 400, which are much more than the 8 DS PHY frames 400 in XG-PON, and false loss of synchronization occurs less than every second, which is much more frequent than every 10 years. There is therefore a need to improve the DS PHY frame 400 and the synchronization state machine 500 in a way that provides quick synchronization with infrequent false loss of synchronization while maintaining a BER of 3e-2.

Disclosed herein are embodiments for frame coding and ONU synchronization in PONs. The embodiments provide for an OLT encoding an SFC field using the same FEC that the OLT encodes a payload with. An ONU decodes the SFC and uses the SFC in a synchronization state machine. The ONU also modifies the synchronization state machine by increasing K, using K in a hunt state, and not considering the SFC in a hunt state or a pre-sync state. Those and other embodiments provide quick synchronization, meaning synchronization with a sufficiently small number of DS PHY frames, while maintaining or improving probabilities of false loss of synchronization and false lock of synchronization and while providing reasonable BERs.

Figure 6:
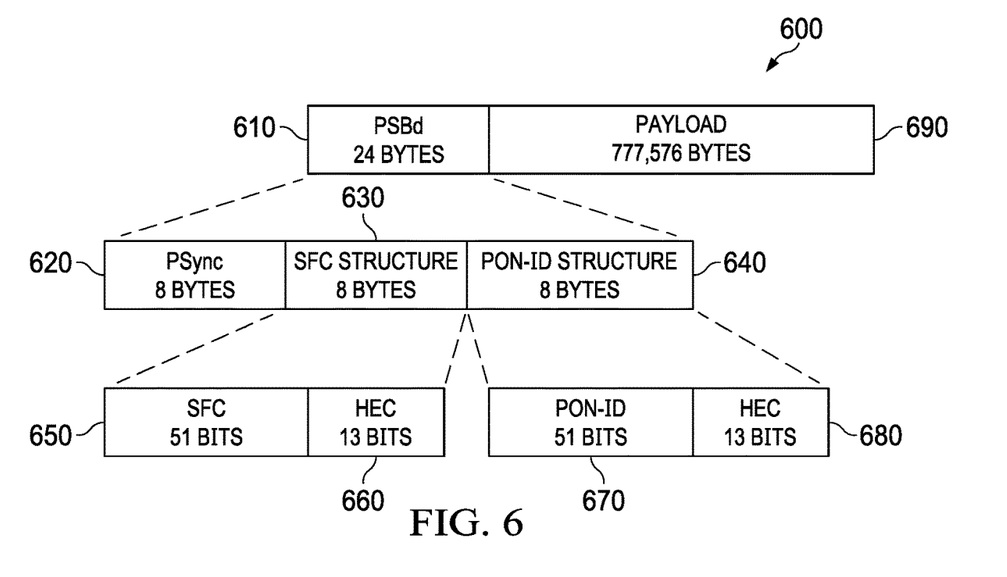
FIG. 6 is a schematic diagram of a DS PHY frame in 50G-PON.

FIG. 6 is a schematic diagram of a DS PHY frame 600 in 50G-PON. The DS PHY frame 600 is similar to the DS PHY frame 400 in FIG. 4. Specifically, the DS PHY frame 600 comprises a PSBd 610 and a payload 690, which are similar to the PSBd 410 and the payload 490, respectively. The PSBd 610 comprises a PSync field 620, an SFC structure field 630, and a PON-ID structure field 640, which are similar to the PSync field 420, the SFC structure field 430, and the PON-ID structure field 440, respectively. The SFC structure field 630 comprises an SFC field 650 and an HEC field 660, which are similar to the SFC field 450 and the HEC field 460, respectively. The PON-ID structure field 640 comprises a PON-ID field 670 and an HEC field 680, which are similar to the PON-ID field 470 and the HEC field 480, respectively.

However, unlike the DS PHY frame 400, which is 155,520 bytes, the DS PHY frame 600 is 777,600 bytes. Unlike the payload 490, which is 155,496 bytes, the payload 690 is 777,576 bytes.

First Embodiment

Figure 7:
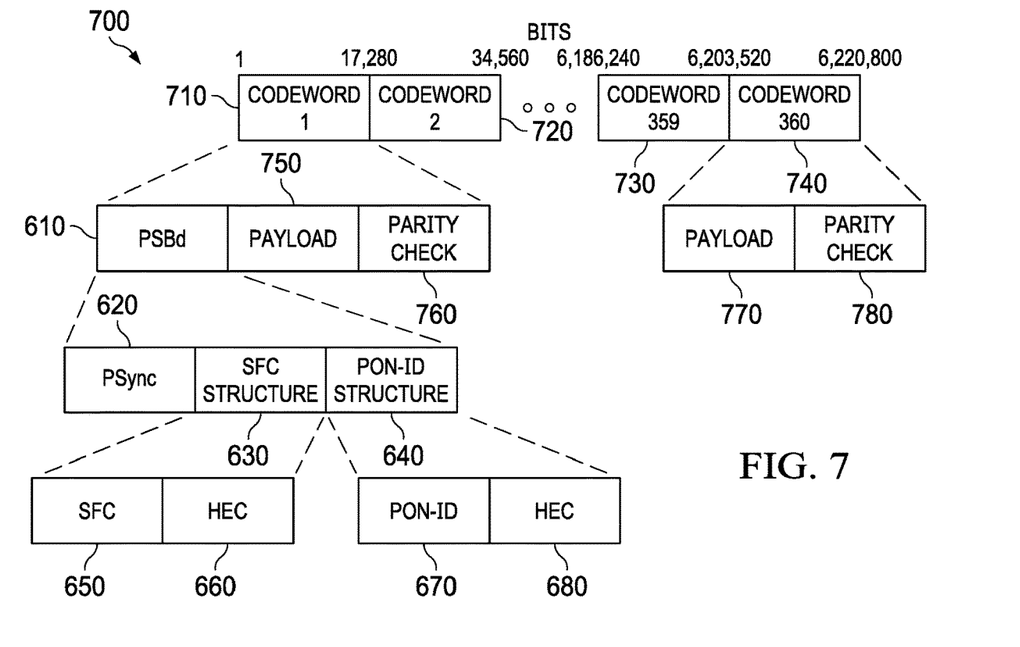
FIG. 7 is a schematic diagram of an encoded DS PHY frame.

In a first embodiment, first, the OLT 110 encodes the PSBd 610, including the SFC field 650, using FEC to obtain a codeword as shown in FIG. 7. An ONU 120 receives and decodes the codeword. The FEC may be the same FEC that the OLT 110 uses to encode the payload 690. The FEC may use an LDPC code. The LDPC code may be based on a mother code of size (17,664, 14,592), where 17,664 is a codeword length and 14,592 is a payload length. The mother code may be the same as that used in IEEE 802.3ca, whose code matrix is a 12×69 quasi-cyclic matrix with a circulant size of 256, corresponding to a codeword length of 17,664 bits. The payload length of each codeword is 256×57 bits, or 14,592 bits, and the parity length of each codeword is (12×69) bits, or 3,072 bits. The LDPC code may be a shortened version or a punctured version of the mother code. When 384 bits are punctured from the parity bits, the LDPC codeword length becomes 17,280 bits so that each DS PHY frame 600 contains 360 codewords. The resulting LDPC code (17,280, 14,592) has a code rate of 0.844.

FIG. 7 is a schematic diagram of an encoded DS PHY frame 700. The encoded DS PHY frame 700 results from encoding the DS PHY frame 600. Similarly, the DS PHY frame 600 results from decoding the encoded DS PHY frame 700. The encoded DS PHY frame 700 comprises codeword 1 710, codeword 2 720, codeword 359 730, and codeword 360 740. The ellipsis between codeword 2 720 and codeword 359 730 indicates the presence of codewords 3-358. Each codeword 710-740 is 17,280 bits.

Codeword 1 710 comprises the PSBd 610, a payload 750, and a parity check 760. The PSBd 610 comprises the PSync field 620, the SFC structure field 630, and the PON-ID structure field 640. The SFC structure field 630 comprises the SFC field 650 and the HEC field 660. The PON-ID structure field 640 comprises the PON-ID field 670 and the HEC field 680. The payload 750 comprises data, for instance, user data, that the OLT 110 desires to pass to an ONU 120. The payload 750 may be a portion of the payload 690. The parity check 760 comprises bits that ensure accurate data transmission.

Codeword 360 740 comprises a payload 770 similar to the payload 750 in codeword 1 710 and comprises a parity check 780 similar to the parity check 760 in codeword 1 710. However, codeword 360 740 does not comprise a PSBd similar to the PSBd 610 in codeword 1 710. Likewise, none of the remaining codewords 720-730 comprises the PSBd 610.

Returning to the first embodiment, second, the OLT 110 scrambles the payload 490. The ONU 120 performs descrambling either before or after decoding. When the ONU 120 verifies the SFC in a pre-sync state, the ONU 120 uses the XG-PON descrambler, which uses a scrambling polynomial $x^{58}+x^{39}+1$ with a variable starting bit sequence [1 1 1 1 1 1 1 SFC], where "SFC" represents bits of an SFC verified in a pre-sync state. When the ONU 120 does not verify the SFC in the pre-sync state, the ONU 120 uses a different descrambler, which comprises the scrambling polynomial $x^{58}+x^{39}+1$ with a fixed starting bit sequence. The fixed starting bit sequence may comprise 58 "1" bits.

Third, the ONU 120 increases K to a suitable value. For instance, the ONU 120 increases K such that K≥7. In addition, the ONU 120 uses K in a hunt state.

Figure 8:
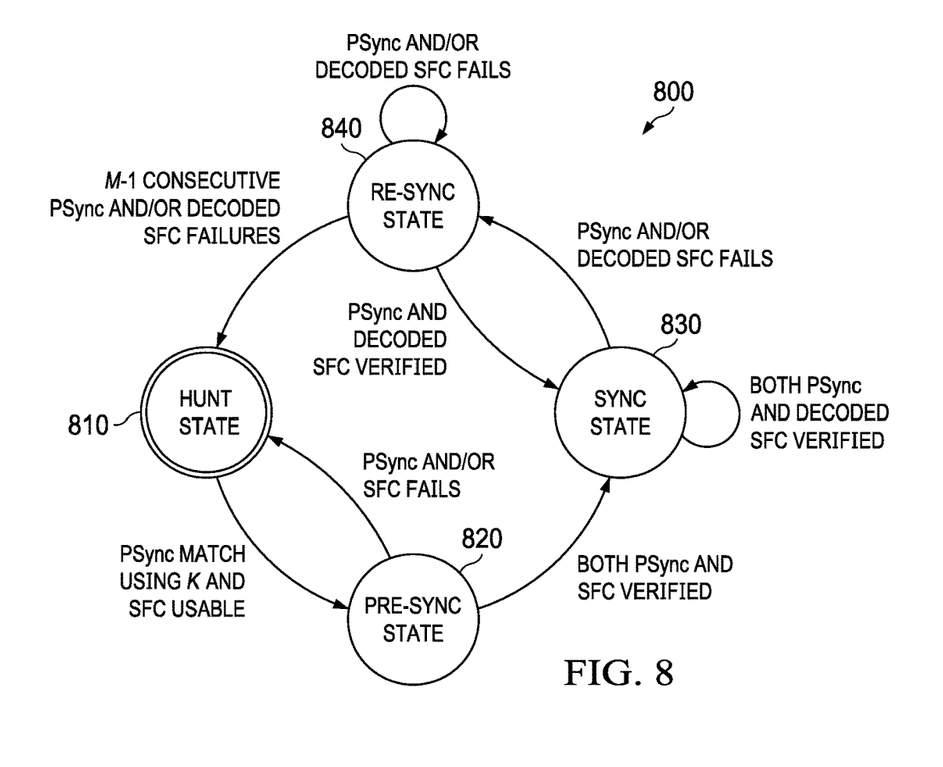
FIG. 8 is a diagram of a synchronization state machine according to a first embodiment.

FIG. 8 is a diagram of a synchronization state machine 800 according to a first embodiment. The synchronization state machine 800 is similar to the synchronization state machine 500 in FIG. 5. Specifically, the synchronization state machine 800 comprises a hunt state 810, a pre-sync state 820, a sync state 830, and a re-sync state 840, which are similar to the hunt state 510, the pre-sync state 520, the sync state 530, and the re-sync state 540, respectively.

However, unlike in the hunt state 510 in which an ONU 120 matches the PSync exactly, in the hunt state 810, the ONU 120 matches the PSync using K. Unlike in the pre-sync state 520, the sync state 530, and the re-sync state 540 in which the ONU uses K=2, in the pre-sync state 820, the sync state 830, and the re-sync state 840, the ONU 120 increases K as described above. Unlike in the sync state 530 and the re-sync state 540 in which the ONU 120 verifies an un-decoded SFC, in the sync state 830 and the re-sync state 840, the ONU 120 verifies a decoded SFC. Thus, the ONU 120 does not decode the SFC until the sync state 830.

When N=64, M=3, and a BER threshold is $1e^{-3}$, XG-PON provides a false loss of synchronization probability of about $10^{-13}$, a false lock of synchronization probability of about $10^{-46}$, about 10 years between false loss synchronization, about $10^{34}$ years between false lock synchronization, and about 8 DS PHY frames 600 needed for synchronization to occur. N represents the number of bits in the PSync field 620 and the locally-stored, predetermined PSync. In contrast, the first embodiment at a BER threshold of $2e^{-2}$ provides a false loss of synchronization probability of about $10^{-3}$-$10^{-22}$, a false lock of synchronization probability of about $10^{-42}$-$10^{-26}$, about $10^{-9}$-$10^{10}$ years between false loss of synchronization, about $10^{30}$-$10^{14}$ years between false lock of synchronization, and about 30-10 DS PHY frames 600 needed for synchronization to occur. The ranges correspond to increasing K from 2-10. Thus, compared to XG-PON, the first embodiment maintains or even improves probabilities of false loss of synchronization and false lock of synchronization at a much worse BER $2e^{-2}$, while providing a reasonable number of DS PHY frames 600 needed for synchronization. The increased number of DS PHY frames 600 needed for synchronization is due to the difficulty in getting usable and verified SFCs before decoding in the sync state 830.

Second Embodiment

In a second embodiment, the OLT 110 and an ONU 120 implement aspects of the first embodiment. Specifically, first, the OLT 110 encodes the PSBd 610 and the ONU 120 decodes the codeword. Second, the OLT 110 scrambles the PSBd 610 and the ONU 120 performs descrambling. Third, the ONU 120 increases K.

Fourth, in addition to those aspects of the first embodiment, the ONU 120 does not consider an SFC in a hunt state or a pre-sync state. Rather, the ONU 120 first considers the SFC in a sync state. This allows the ONU 120 to quickly proceed to the sync state and thus reduce a number of DS PHY frames 600 needed for synchronization to occur.

Fifth, the OLT 110 and the ONU 120 increase N. For instance, the OLT 110 and the ONU 120 increase N such that N≥128. The PSync field 620 may comprise a 64-bit PSync followed by a 64-bit PSync', where PSync' is the opposite of PSync. The 64-bit PSync may be [0xC5e5 1840 fd59 bb49]. To accommodate the increased N, the OLT 110 and the ONU 120 may correspondingly decrease a number of bits in the payload 690.

Figure 9:
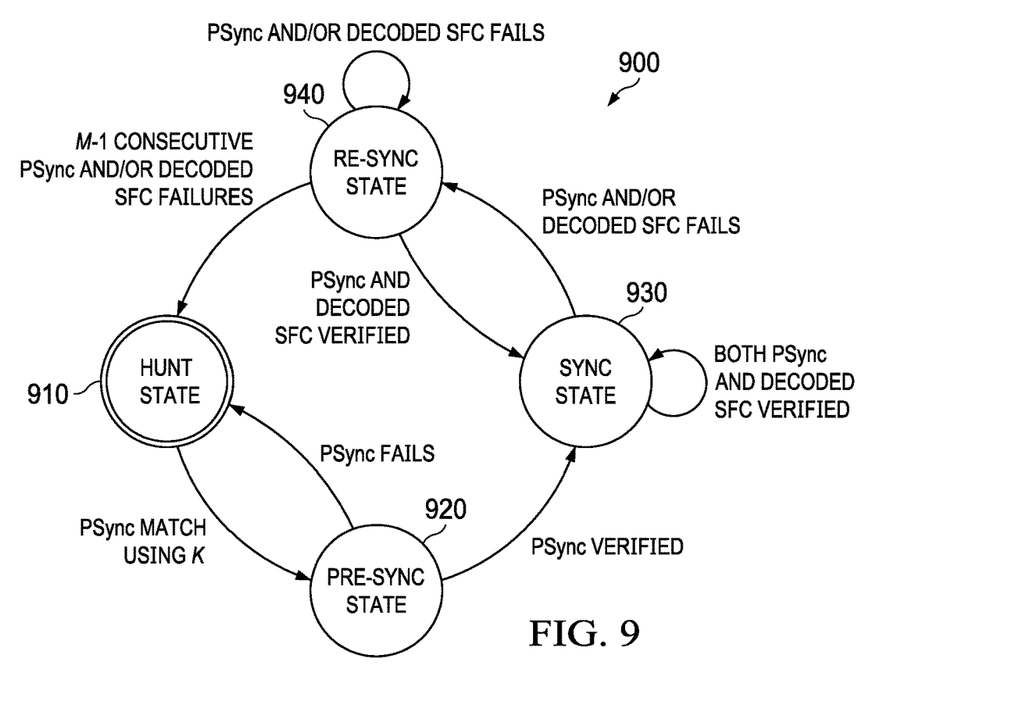
FIG. 9 is a diagram of a synchronization state machine according to a second embodiment.

FIG. 9 is a diagram of a synchronization state machine 900 according to a second embodiment. The synchronization state machine 900 is similar to the synchronization state machine 800 in FIG. 8. Specifically, the synchronization state machine 900 comprises a hunt state 910, a pre-sync state 920, a sync state 930, and a re-sync state 940, which are similar to the hunt state 810, the pre-sync state 820, the sync state 830, and the re-sync state 840, respectively.

However, unlike in the hunt state 810 in which an ONU 120 determines whether 8 bytes immediately following a PSync form a usable SFC, in the hunt state 910, the ONU 120 does not make that determination. Unlike in the pre-sync state 820 in which the ONU 120 determines whether 8 bytes immediately following a PSync are verified as an SFC, in the pre-sync state 920, the ONU 120 does not make that determination. Unlike in the hunt state 810, the pre-sync state 820, the sync state 830, and the re-sync state 840 in which the ONU 120 uses N=64, in the hunt state 910, the pre-sync state 920, the sync state 930, and the re-sync state 940, the ONU 120 uses N≥128.

When N=64, M=3, and a BER threshold is $2e^{-2}$, the second embodiment provides a false loss of synchronization probability of about $10^{-3}$-$10^{-22}$, a false lock of synchronization probability of about $10^{-25}$-$10^{-9}$, about $10^{-9}$-$10^{10}$ years between false loss of synchronization, about $10^{13}$-$10^{-3}$ years between false lock of synchronization, and about 20-2 DS PHY frames 600 needed for synchronization to occur. The ranges correspond to increasing K from 2-10. When K=7, the false loss of synchronization probability and false lock of synchronization probability are about the same. In addition, when K≥7, 2 DS PHY frames 600 are needed for synchronization to occur. For those reasons, K=7 may provide an optimal performance. Thus, compared to XG-PON and when N=64, the second embodiment may improve a probability of false loss of synchronization and provide a reasonable probability of false lock of synchronization, while reducing a number of DS PHY frames 600 needed for synchronization. Compared to the first embodiment, the second embodiment reduces the number of DS PHY frames 600 needed for synchronization, while providing a reasonable probability of false loss of synchronization.

When N=128, M=3, and a BER threshold is $5e^{-2}$, the second embodiment provides a false loss of synchronization probability of about $10^{-14}$ $10^{-34}$, a false lock of synchronization probability of about $10^{-27}$-$10^{-14}$, about $10^{2}$-$10^{22}$ years between false loss of synchronization, about $10^{15}$-$10^{2}$ years between false lock of synchronization, and about 2 DS PHY frames 600 needed for synchronization to occur. The ranges correspond to increasing K from 18-28. Thus, compared to XG-PON and when N=128, the second embodiment may improve probabilities of false lock of synchronization and provide a reasonable probability of false lock of synchronization, while reducing a number of DS PHY frames 600 needed for synchronization. Compared to the first embodiment, the second embodiment reduces the number of DS PHY frames 600 needed for synchronization, while providing a reasonable probability of false lock of synchronization. Compared to the second embodiment when N=64, the second embodiment when N=128 further reduces probabilities of false loss of synchronization and false lock of synchronization.

Third Embodiment

In a third embodiment, the OLT 110 and an ONU 120 implement aspects of the second embodiment. Specifically, first, the OLT 110 encodes the PSBd 610 and the ONU 120 decodes the codewords. Second, the OLT 110 scrambles the PSBd 610 and the ONU 120 performs descrambling. Third, the ONU 120 increases K. Fourth, the ONU 120 does not consider an SFC in a hunt state or a pre-sync state, but first considers the SFC in a sync state. Fifth, the OLT 110 and the ONU 120 increase N.

Sixth, in addition to those aspects of the second embodiment, the ONU 120 verifies a first FEC codeword instead of a PSync in a pre-sync state. The first FEC codeword may be the first codeword, in terms of a position, that the ONU 120 recognizes as encoded with FEC. For instance, the first FEC codeword is codeword 1 710.

Figure 10:
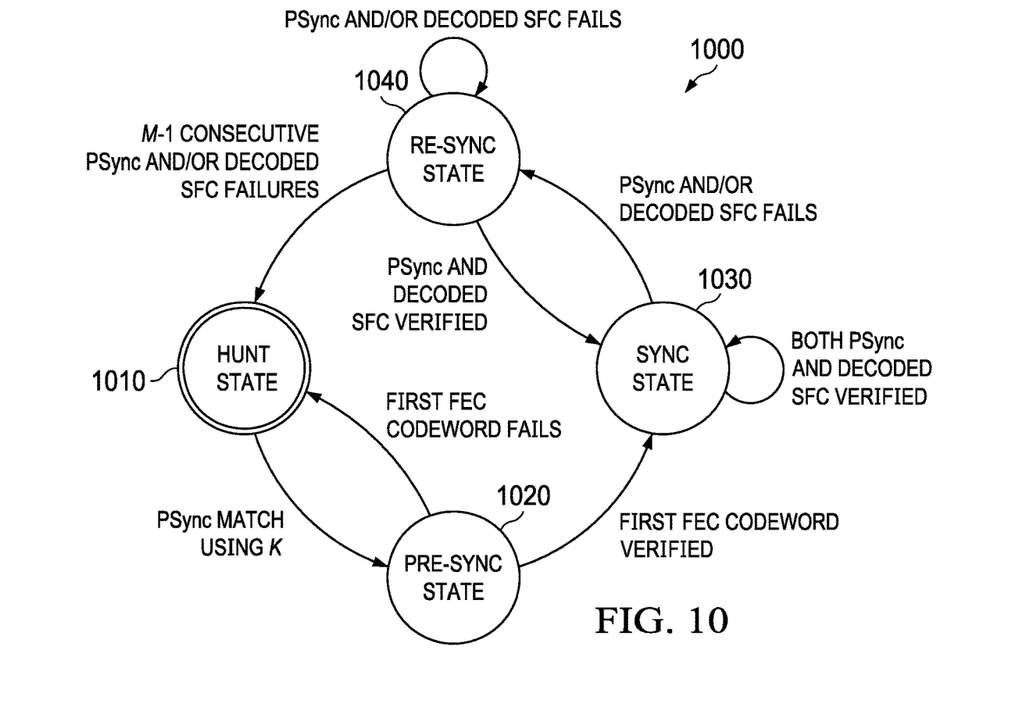
FIG. 10 is a diagram of a synchronization state machine according to a third embodiment.

FIG. 10 is a diagram of a synchronization state machine 1000 according to a third embodiment. The synchronization state machine 1000 is similar to the synchronization state machine 900 in FIG. 9. Specifically, the synchronization state machine 1000 comprises a hunt state 1010, a pre-sync state 1020, a sync state 1030, and a re-sync state 1040, which are similar to the hunt state 910, the pre-sync state 920, the sync state 930, and the re-sync state 940, respectively.

However, unlike in the pre-sync state 920 in which an ONU 120 matches a PSync, in the pre-sync state 1020, the ONU 120 verifies that a first FEC codeword is error free or free of uncorrectable errors. If the ONU 120 verifies the first FEC codeword, then the ONU 120 proceeds to the sync state 1030. If the ONU 120 cannot verify the first FEC codeword, then the ONU 120 returns to the hunt state 1010. This allows the ONU 120 to proceed to the sync state 1030 with a relatively lower probability of false lock of synchronization.

When N=64, M=3, and a BER threshold is $2e^{-2}$, the third embodiment provides a false loss of synchronization probability of about $10^{-3}$-$10^{-22}$, a false lock of synchronization probability of about $10^{-86}$-$10^{-78}$, about $10^{-9}$-$10^{10}$ years between false loss of synchronization, about $1073$-$10^{65}$ years between false lock of synchronization, and about 5-1 DS PHY frames 600 needed for synchronization to occur. The ranges correspond to increasing K from 2-10. Only one DS PHY frame 600 is needed when K≥7, the ONU 120 may match a PSync and verify a first FEC codeword using the same DS PHY frame 600.

Line Conditioning, FEC Alignment, Data Framing, and Layer Ordering Alternatives

The OLT 110 and the ONUs 120 may implement various conditioning, coding, and scrambling alternatives. For instance, the OLT 110 and the ONUs 120 may implement block-coded, self-synchronous, scrambler, or frame-synchronous scrambler line conditioning. The OLT 110 and the ONUs 120 may implement block-coded, frame-synchronous, or packet-based FEC alignment. The OLT 110 and the ONUs 120 may implement periodic pattern or block-coded data framing. Finally, the OLT 110 and the ONUs 120 may implement FtS or StF layer ordering. The above alternatives provide 36 combinations of design implementation.

Figure 11:
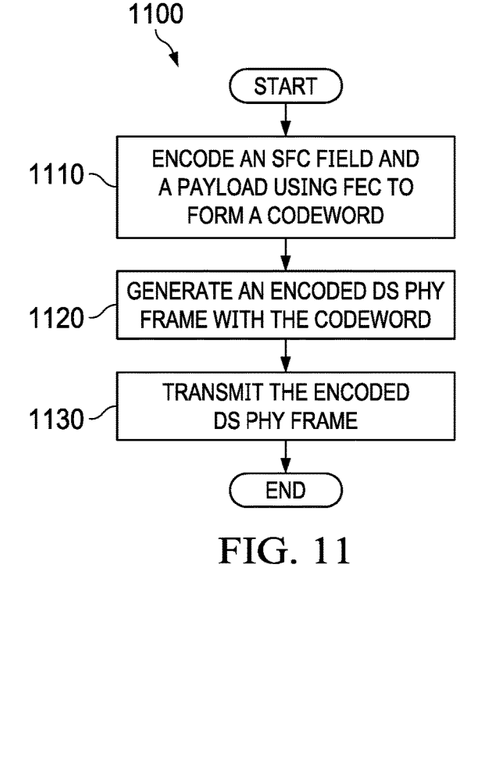
FIG. 11 is a flowchart illustrating a method of encoded DS PHY frame generation according to an embodiment.

FIG. 11 is a flowchart illustrating a method 1100 of encoded DS PHY frame generation according to an embodiment. The OLT 110 implements the method 1100. At step 1110, an SFC field and a payload are encoded using FEC to form a codeword. For instance, the OLT 110 encodes the SFC field 650 and the payload 750 to form codeword 1 710. At step 1120, an encoded DS PHY frame is generated with the codeword. For instance, the OLT 110 generates the encoded DS PHY frame 700 with codeword 1 710. Finally, at step 1130, the encoded DS PHY frame is transmitted. For instance, the OLT 110 transmits the encoded DS PHY frame 700 to an ONU 120.

Figure 12:
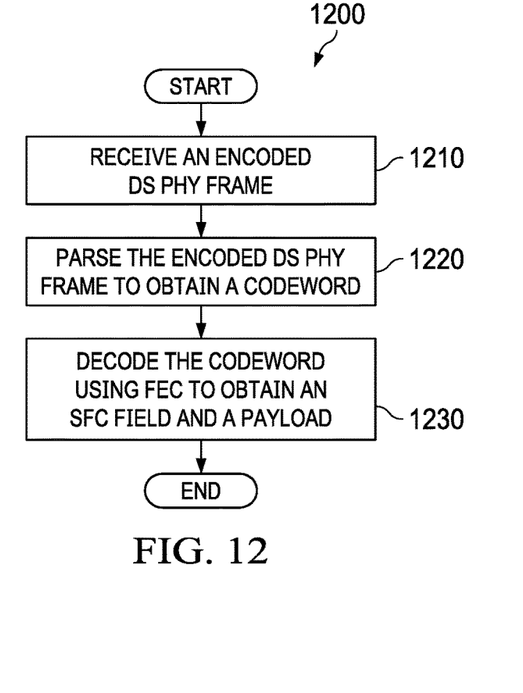
FIG. 12 is a flowchart illustrating a method of encoded DS PHY frame decoding according to an embodiment.

FIG. 12 is a flowchart illustrating a method 1200 of encoded DS PHY frame decoding according to an embodiment. An ONU 120 implements the method 1200. At step 1210, an encoded DS PHY frame is received. For instance, the ONU 120 receives the encoded DS PHY frame 700 from the OLT 110. At step 1220, the encoded DS PHY frame is parsed to obtain a codeword. For instance, the ONU 120 parses the encoded DS PHY frame 700 to obtain codeword 1 710. Finally, at step 1230, the codeword is decoded using FEC to obtain an SFC field and a payload. For instance, the ONU 120 decoded codeword 1 710 to obtain the SFC field 650 and the payload 750.

Figure 13:
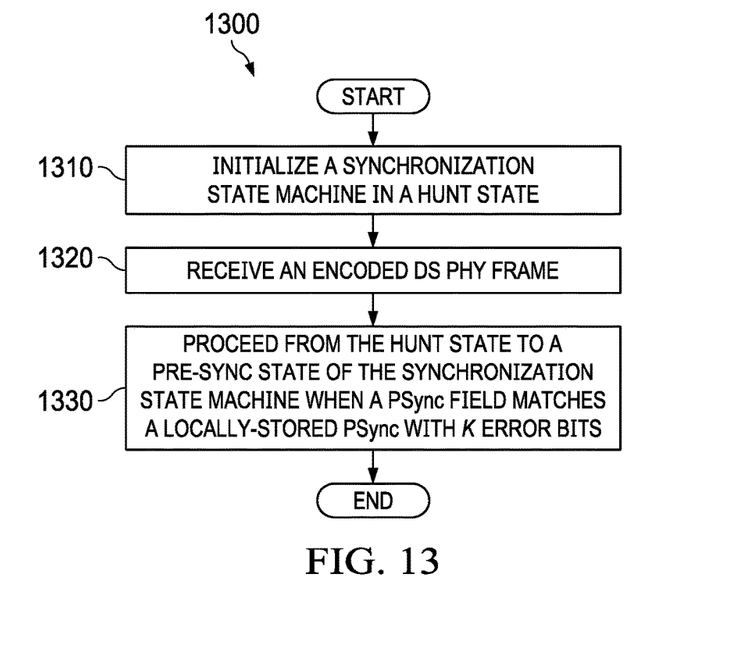
FIG. 13 is a flowchart illustrating a method of synchronization according to an embodiment.

FIG. 13 is a flowchart illustrating a method 1300 of synchronization according to an embodiment. An ONU 120 implements the method 1300. At step 1310, a synchronization state machine is initialized in the hunt state. For instance, the ONU 120 initializes the synchronization state machine 800 in the hunt state 810, the synchronization state machine 900 in the hunt state 910, or the synchronization state machine 1000 in the hunt state 1010. At step 1320, an encoded DS PHY frame is received. For instance, the ONU 120 receives the encoded DS PHY frame 700 from the OLT 110. Finally, at step 1330, the hunt state proceeds to a pre-sync state of the synchronization state machine when a PSync field matches a locally-stored PSync with K error bits. For instance, the ONU 120 proceeds from the hunt state 810 to the pre-sync state 820, the hunt state 910 to the pre-sync state 920, or the hunt state 1010 to the pre-sync state 1020 when the PSync field 620 matches a locally-stored PSync.

Figure 14:
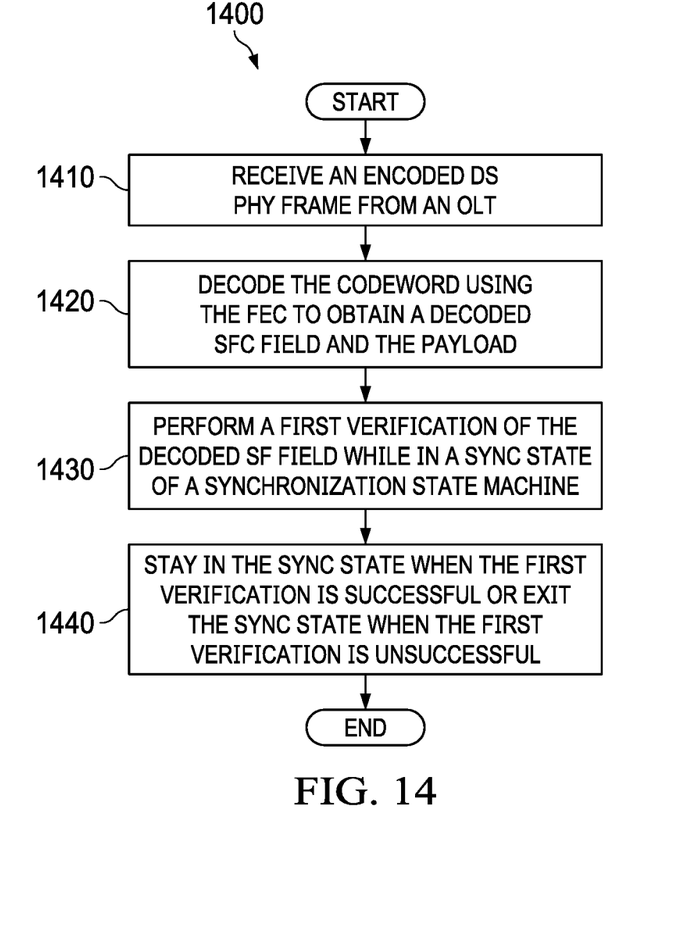
FIG. 14 is a flowchart illustrating a method of synchronization according to another embodiment.

FIG. 14 is a flowchart illustrating a method 1400 of synchronization according to another embodiment. An ONU 120 implements the method 1400 in a 50G-PON. At step 1410, an encoded DS PHY frame is received from an OLT. The encoded DS PHY frame comprises an FEC codeword. The FEC codeword comprises an SFC field and a payload. The SFC field and the payload are encoded with a same FEC. For instance, the ONU 120 receives the encoded DS PHY frame 700 from the OLT 110. At step 1420, the codeword is decoded using the FEC to obtain a decoded SFC field and the payload. For instance, the ONU 120 decodes codeword 1 710 to obtain the SFC field 650 and the payload 750.

At step 1430, a first verification of the decoded SFC field is performed while in a sync state of a synchronization state machine. For instance, the ONU 120 verifies the SFC field 650 while in the sync state 830, 930, or 1030. Finally, at step 1440, the sync state is stayed in when the first verification is successful or the sync state is exited from when the first verification is unsuccessful. For instance, the ONU 120 stays in the sync state 830, 930, or 1030 or proceeds to the re-sync state 840, 940, or 1040.

The method 1400 may implement additional embodiments. For instance, the codeword further comprises a PSync field, and the method 1400 further comprises performing a second verification of the PSync field while in the sync state; and staying in the sync state when the second verification is successful or exiting the sync state when the second verification is unsuccessful.

The FEC uses an LDPC code. The LDPC code is based on a mother code of size (17,664, 14,592), where 17,664 is a bit length of the codeword and 14,592 is a bit length of the payload. The LDPC code has a length of 17,280 bits.

The method 1400 further comprises: initializing in a hunt state of the synchronization state machine; proceeding from the hunt state to a pre-sync state of the synchronization state machine; and proceeding from the pre-sync state to the sync state. The method 1400 further comprises proceeding from the hunt state to the pre-sync state based on FEC-decoded PSync pattern matching and SFC checking. The method 1400 further comprises proceeding from the pre-sync state to the sync state based on FEC-decoded PSync pattern matching and SFC verification. The method 1400 further comprises proceeding from the hunt state to the pre-sync state based only on PSync pattern matching; and proceeding from the pre-sync state to the sync state based only on the PSync pattern matching. The PSync pattern matching is based on a 64-bit PSync. The method 1400 further comprises proceeding from the hunt state to the pre-sync state based only on PSync pattern matching; proceeding from the pre-sync state to the sync state based on a second verification of a first FEC codeword; and returning from the pre-sync state to the hunt state when the second verification fails.

The method 1400 further comprises proceeding from the sync state to a re-sync state of the synchronization state machine; and proceeding from the sync state to the re-sync state when either PSync pattern matching or SFC verification fails. The method 1400 further comprises returning from the re-sync state to the sync state when PSync pattern matching and SFC verification succeed; staying in the re-sync state for up to (M−2) consecutive failures of PSync pattern matching or SFC verification; and returning from the re-sync state to the sync state when PSync pattern matching and SFC verification are successful. The method 1400 further comprises returning from the re-sync state to a hunt state of the synchronization state machine when FEC-decoded PSync pattern matching or SFC verification fails (M−1) times. M is ≥2

The codeword further comprises a DS PSBd. The DS PSBd contains a PSync field and the SFC field.

Before decoding the codeword, the method 1400 further comprises descrambling the codeword using a descrambler. The method further comprises further descrambling the codeword using a scrambling polynomial $x^{58}+x^{39}+1$. The method further comprises further descrambling the codeword using a variable starting bit sequence based on the SFC field. The variable starting bit sequence is [1 1 1 1 1 1 1 SFC], and wherein "SFC" represents bits of the SFC field. The method further comprises further descrambling the codeword using a fixed starting sequence based on a fixed bit pattern. The fixed starting bit sequence is 58 "1" bits.

After decoding the codeword, the method further comprises descrambling the payload using a descrambler. The method further comprises further descrambling the payload using a scrambling polynomial $x^{58}+x^{39}+1$. The descrambler is based on self-scrambling of data. The descrambler is based on scrambling with a known bit pattern that starts with a fixed starting bit sequence. The fixed starting bit sequence is 58 "1" bits. The descrambler is based on scrambling with a known bit pattern with a variable starting bit sequence that contains the decoded SFC field. The variable starting bit sequence is [1 1 1 1 1 1 1 SFC], and wherein "SFC" represents bits of the decoded SFC field. The variable starting bit sequence is [1 0 1 0 1 0 1 SFC], and wherein "SFC" represents bits of the decoded SFC field.

An ONU in a 50G-PON comprises a receiving means and a processing means coupled to the receiving means. The receiving means is configured to receive an encoded DS PHY frame from an OLT. The encoded DS PHY frame comprises an FEC codeword. The FEC codeword comprises an SFC field and a payload. The SFC field and the payload are encoded with a same FEC. The processing means is configured to decode the FEC codeword using the FEC to obtain a decoded SFC field and the payload, perform a first verification of the decoded SFC field while in a sync state of a synchronization state machine, stay in the sync state when the first verification is successful, and exit the sync state when the first verification is unsuccessful.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by an optical network unit (ONU) in a 50-gigabit-capable passive optical network (50G-PON), the method comprising:
   receiving an encoded downstream (DS) physical layer (PHY) frame from an optical line terminal (OLT), the encoded DS PHY frame comprises a forward error correction (FEC) codeword, the FEC codeword comprises a superframe counter (SFC) field and a payload, and the SFC field and the payload are encoded with a same FEC;
   decoding the FEC codeword using the FEC to obtain a decoded SFC field and the payload;
   performing a first verification on the decoded SFC field while in a synchronization (sync) state of a synchronization state machine; and
   staying in the sync state when the first verification is successful or exiting the sync state when the first verification is unsuccessful.

2. The method of claim 1, wherein the FEC codeword further comprises a physical synchronization sequence (PSync) field, and wherein the method further comprises:
   performing a second verification on the PSync field while in the sync state; and
   staying in the sync state when the second verification is successful or exiting the sync state when the second verification is unsuccessful.

3. The method of claim 1, wherein the FEC uses a low-density parity-check (LDPC) code, wherein the LDPC code is based on a mother code of size (17,664, 14,592), wherein 17,664 is a bit length of the FEC codeword and 14,592 is a bit length of the payload, and wherein the LDPC code has a length of 17,280 bits.

4. The method of claim 1, further comprising:
   initializing in a hunt state of the synchronization state machine;
   proceeding from the hunt state to a pre-sync state of the synchronization state machine; and
   proceeding from the pre-sync state to the sync state.

5. The method of claim 4, further comprising proceeding from the hunt state to the pre-sync state based on FEC-decoded physical synchronization sequence (PSync) pattern matching and SFC checking.

6. The method of claim 4, further comprising proceeding from the pre-sync state to the sync state based on FEC-decoded physical synchronization sequence (PSync) pattern matching and SFC verification.

7. The method of claim 4, further comprising:
   proceeding from the hunt state to the pre-sync state based only on physical synchronization sequence (PSync) pattern matching; and
   proceeding from the pre-sync state to the sync state based only on the PSync pattern matching.

8. The method of claim 7, wherein the PSync pattern matching is based on a 64-bit PSync.

9. The method of claim 4, further comprising:
   proceeding from the hunt state to the pre-sync state based only on physical synchronization sequence (PSync) pattern matching;
   proceeding from the pre-sync state to the sync state based on a second verification on a first FEC codeword; and
   returning from the pre-sync state to the hunt state when the second verification fails.

10. The method of claim 1, further comprising:
    proceeding from the sync state to a re-sync state of the synchronization state machine; and
    proceeding from the sync state to the re-sync state when either FEC-decoded physical synchronization sequence (PSync) pattern matching or SFC verification fails.

11. The method of claim 10, further comprising:
    returning from the re-sync state to the sync state when FEC-decoded PSync pattern matching and SFC verification succeed;
    staying in the re-sync state for up to (M−2) consecutive failures of physical synchronization sequence (PSync) pattern matching or SFC verification; and returning from the re-sync state to the sync state when PSync pattern matching and SFC verification are successful.

12. The method of claim 10, further comprising returning from the re-sync state to a hunt state of the synchronization state machine when FEC-decoded physical synchronization sequence (PSync) pattern matching or SFC verification fails (M−1) times, wherein M is ≥2.

13. The method of claim 1, wherein the FEC codeword further comprises a DS physical synchronization block (PSBd), and wherein the DS PSBd contains a physical synchronization sequence (PSync) field and the SFC field.

14. The method of claim 1, wherein before decoding the FEC codeword, the method further comprises descrambling the FEC codeword using a descrambler.

15. An optical network unit (ONU) comprising:
a memory configured to store instructions; and
a processor coupled to the memory and configured to execute the instructions to cause the ONU to:
receive an encoded downstream (DS) physical layer (PHY) frame from an optical line terminal (OLT), the encoded DS PHY frame comprises a forward error correction (FEC) codeword, the FEC codeword comprises a superframe counter (SFC) field and a payload, and the SFC field and the payload are encoded with a same FEC;
decode the FEC codeword using the FEC to obtain a decoded SFC field and the payload;
perform a first verification on the decoded SFC field while in a synchronization (sync) state of a synchronization state machine; and
stay in the sync state when the first verification is successful or exit the sync state when the first verification is unsuccessful.

16. The ONU of claim 15, wherein the FEC codeword further comprises a physical synchronization sequence (PSync) field, and wherein the processor is further configured to execute the instructions to cause the ONU to:
perform a second verification on the PSync field while in the sync state; and
stay in the sync state when the second verification is successful or exit the sync state when the second verification is unsuccessful.

17. The ONU of claim 15, wherein the FEC uses a low-density parity-check (LDPC) code, wherein the LDPC code is based on a mother code of size (17,664, 14,592), wherein 17,664 is a bit length of the FEC codeword and 14,592 is a bit length of the payload, and wherein the LDPC code has a length of 17,280 bits.

18. A computer program product comprising instructions that are stored on a non-transitory medium and that, when executed by a processor, cause an optical network unit (ONU) to:
receive an encoded downstream (DS) physical layer (PHY) frame from an optical line terminal (OLT), the encoded DS PHY frame comprises a forward error correction (FEC) codeword, the FEC codeword comprises a superframe counter (SFC) field and a payload, and the SFC field and the payload are encoded with a same FEC;
decode the FEC codeword using the FEC to obtain a decoded SFC field and the payload;
perform a first verification on the decoded SFC field while in a synchronization (sync) state of a synchronization state machine; and
stay in the sync state when the first verification is successful or exit the sync state when the first verification is unsuccessful.

19. The computer program product of claim 18, wherein the FEC codeword further comprises a physical synchronization sequence (PSync) field, and wherein the instructions, when executed by the processor, further cause the ONU to:
perform a second verification on the PSync field while in the sync state; and
stay in the sync state when the second verification is successful or exit the sync state when the second verification is unsuccessful.

20. The computer program product of claim 18, wherein the FEC uses a low-density parity-check (LDPC) code, wherein the LDPC code is based on a mother code of size (17,664, 14,592), wherein 17,664 is a bit length of the FEC codeword and 14,592 is a bit length of the payload, and wherein the LDPC code has a length of 17,280 bits.

\* \* \* \* \*